Patented Sept. 5, 1922.

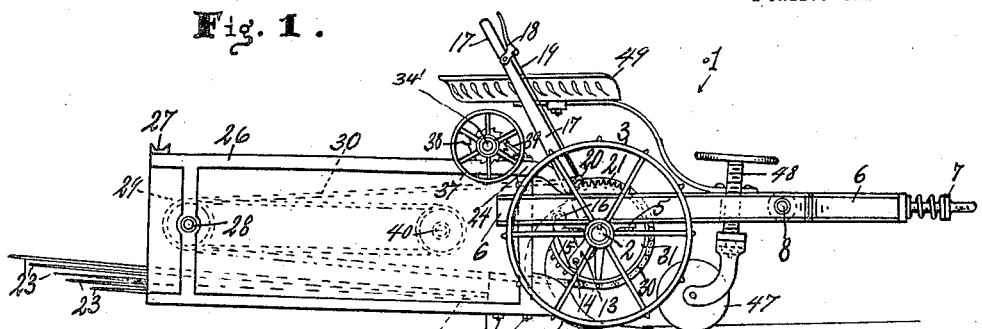
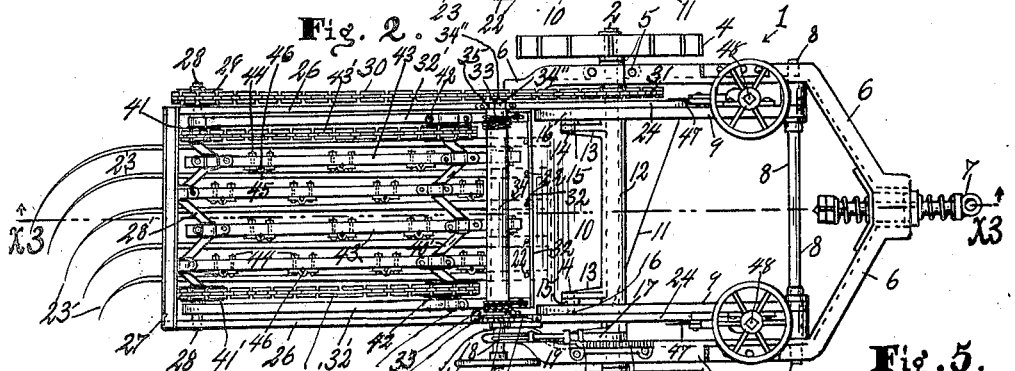
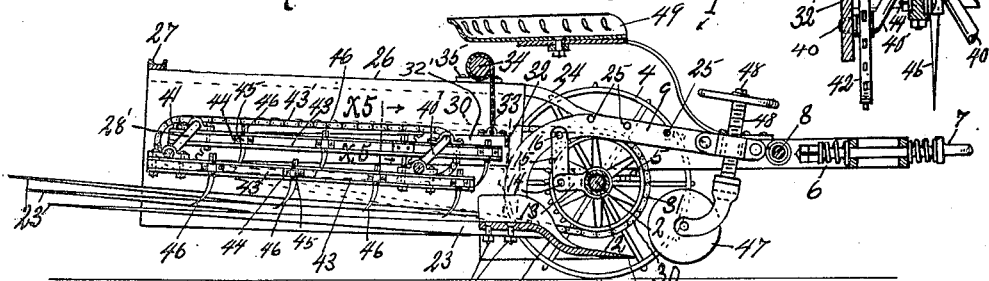
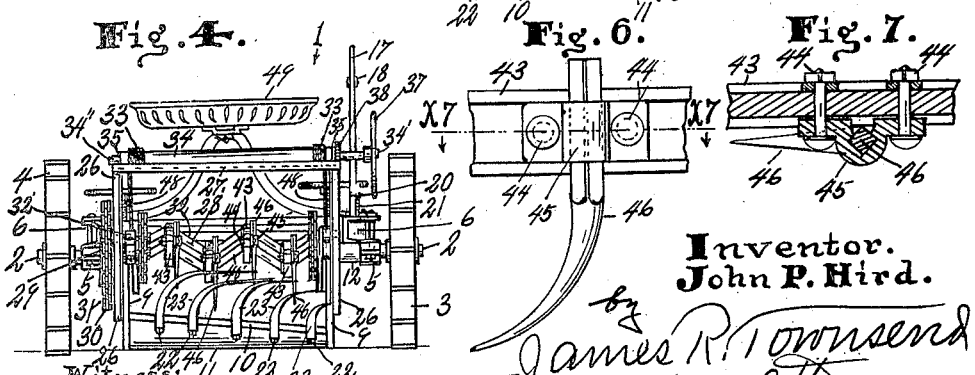

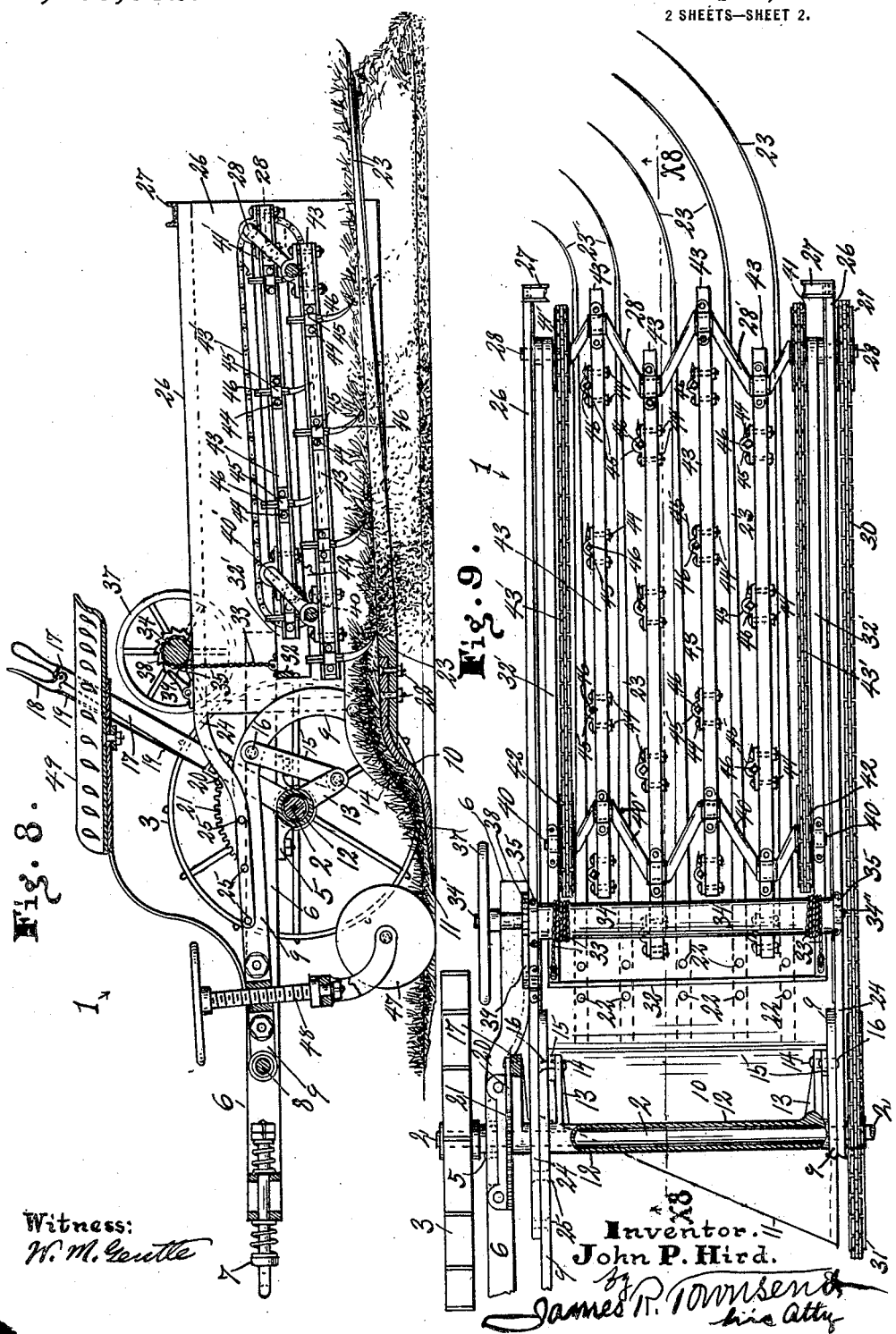

1,428,032

UNITED STATES PATENT OFFICE.

JOHN P. HIRD, OF REDLANDS, CALIFORNIA.

WEED AND GRASS EXTERMINATING MACHINE.

Application filed April 7, 1920. Serial No. 372,076.

*To all whom it may concern:*

Be it known that I, JOHN P. HIRD, a citizen of the United States, residing at Redlands, in the county of San Bernardino and State of California, have invented a new and useful Weed and Grass Exterminating Machine, of which the following is a specification.

This invention relates to agricultural appliances used principally for loosening the top portion of soil and extracting therefrom roots or vegetation growing therein.

An object of this invention is to provide a practical machine by means of which sod or foul ground may be readily freed from grass roots and left in a finely pulverized condition ready for immediate seeding for crops.

It is a principle of this invention that the sod or foul surface of the ground to be treated shall be severed, lifted and shaken to remove vegetable growth, as weeds, grass and roots, from the dirt and the machine is adapted to then dispose the same in windrows to dry and to be gathered and burnt or otherwise finally disposed of.

The machine may be made in various ways to run with power applied either in the front or the rear, but it is only necessary to illustrate it in one of such forms.

Said machine comprises a cutter adapted to cut the edges of a strip of sod; a blade having a horizontal edge to follow the cutters and sloping upwardly from said edge; a set of supporting fingers to receive the sod from said blade; and jiggers adapted to lift, shake and move backward the grass or other plant life and to cause the dirt to drop to the ground in a pulverized condition.

Ease of severing sod, simplicity and strength of construction; and adjustability to the work are further objects.

An object of invention is to provide a machine that will be effective in lifting the strips of soil to disintegrating members where roots of weeds and wild grass are removed from the strips of soil and discharged into windrows at the side of the machine while the strip of soil is disintegrated and replaced in a loose condition in the trench from which is was removed. By means of the disintegrating members the soil is thoroughly loosened from the weed or grass roots so that when discharged to the windrow they speedily wither and die, after which they are in condition for burning or removing from the field.

Another object of the invention is to provide a machine that is capable of working over a large area of land per day; as it is usually very desirable that only the briefest time possible be expended in the preparation of large tracts of land that are to be reseeded. Time is usually an element of great importance relative to planting; and consequently it is highly desirable that machines operated for soil preparation and weed and wild grass eradication be capable of large execution.

An object of this invention is to make provision whereby the strip of soil lifted and disintegrated may be of considerable width; and its depth of cut can be varied from merely skimming or shaving the top surface of the ground, to cutting as much as eight inches deep which latter depth is regarded as sufficient in the most stubborn cases. The forward movement of the machine is limited only by the propelling power of the team, tractor or other means by which the machine is operated.

An object is to make provision whereby the soil is shaken from the vegetable growth and deposited in practically the same place it occupied before the approach of the machine.

Another object is to make provision whereby large obstacles such as rocks or hard lumps of ground entering the machine will not render the machine inoperative or subject the disintegrating means to breakage.

Other objects, advantages and features of invention may appear from the accompanying drawing, the subjoined detail description and the appended claims.

The accompanying drawings illustrate the invention.

Figure 1 is a side elevation of the machine with plow and associated parts lowered into operating position.

Fig. 2 is a plan view of the machine, omitting the seat.

Fig. 3 is a section on line $x^3$, Fig. 2 with plow and associated parts elevated into idle position.

Fig. 4 is a rear elevation of the machine with plow lowered into position for skimming or shaving the top surface of the ground.

Fig. 5 is an enlarged fragmental section on line $x^5$, Fig. 3.

Fig. 6 is an enlarged side elevation of one of the disintegrating teeth attached to a reciprocating bar.

Fig. 7 is a section on line $x^7$, Fig. 6, showing the attachment of a disintegrating tooth to a reciprocating bar.

Fig. 8 is an enlarged central longitudinal section on line $x^8$, Fig. 9 looking toward the right side of the machine.

Fig. 9 is a fragmental plan of the machine on the same scale as Fig. 8, parts being broken away.

The machine 1 has a shaft 2 to which are secured the drive wheels 3, 4. Shaft 2 is mounted in bearings 5 that are secured to the main frame 6 which is propelled by suitable means as indicated by the draw bar 7. The machine may be attached to a tractor or team, not shown and thereby propelled.

To the main frame 6 there are pivotally connected by cross rod 8 the forward ends of plow beams 9; which extend rearwardly and are bent downward at the rear and have attached to their lower ends the lifting board 10. The share 11 may be connected thereto in any usual way, and extends across the machine at an angle of 45° more or less.

On shaft 2 there is loosely mounted a sleeve 12 that has arms 13 pivotally connected by pins 14 to lower ends of links 15, that have their upper ends pivotally connected by pins 16 to the beams 9.

At the right hand side of the machine there is a hand lever 17 that has its lower end connected to sleeve 12 and this lever is provided with hand grip 18 that is connected by rod 19 to latch 20 that is adapted to lock in teeth of sector plate 21 secured to stationary frame 6. When hand lever 17 is actuated it moves sleeve 12 and associated parts to raise or lower the plow beams.

To the bottom and rear of lifting board 10 are secured by bolts 22 the spaced fingers 23 that extend rearwardly and also slightly aslant upwardly. These fingers may be curved at their rear ends toward one side of the machine so that material travelling rearwardly over them will be diverted into a windrow out of the way of the machine at its next trip across the field. In other words the machine is so constructed that after making one cut across a field the grass and weeds will be displaced toward the right side of the machine, thus to make clearance for the right hand wheel to travel in when the machine makes its next cut across the field in the same direction.

Rearwardly extending arms 24 are secured by suitable means as the bolts 25 to plow beams 9 and are arranged to support side boards 26 that are preferably formed of sheet and strap iron properly secured together. The sides 26 are secured together at their top rear ends by a channel plate 27; and near the rear end and centrally of sides 26 there is mounted a crank shaft 28 that extends through the left side board 26 and has secured to its outwardly extending end a sprocket wheel 29 that is connected by sprocket chain 30 to driving sprocket wheel 31 secured on shaft 2; by which connection the crank shaft 28 is driven.

Between the side boards 26 and near thereto is an adjustable jigger frame formed of end bar 32 and side bars 32'. The rear ends of the side bars are pivoted on the rear crank shaft 28. The forward end of the frame is resiliently carried by cables 33 connected to a drum 34 which has stub shafts 34', 34" mounted in bearings 35 secured on the side board 26. The stub shaft 34' is extended on the right hand side of the machine and has attached thereto a hand wheel 37 by which the drum 34 is turned to raise or lower the forward end of frame 32, 32'. Drum 34 has a ratchet 38 controlled by pawl 39 to support the forward ends of the pivoted frame 32.

A front crank shaft 40 similar to the rear crank shaft 28 is carried by the forward end of the adjustable frame. The crank shaft 28 is provided near its ends with sprocket wheels 41, 41' and the front shaft 40 is provided with corresponding sprocket wheels 42, and the wheels are connected by sprocket chains 43'; so that when crank shaft 28 is driven it will drive crank shaft 40. The sprocket wheels 41, and 42 are the same diameter as is also the throw of crank arms 28' and 40' on shafts 28 and 40; so that the parts operate freely together.

The fingers 23 may be of steel and taper from front to rear. The front ends may be about one-half inch thick at the forward top corner and are reduced in thickness in both directions downwardly and rearwardly tapering rearwardly to a point and downwardly to an edge. They are set at appropriate distances apart and such distance at present is calculated to be about two inches between the fingers.

Above the fingers and mounted on crank shafts 28 and 40 are oscillating jigger rods 43, each of which has secured thereto by clips comprising bolts 44 and clip members 45, a plurality of downwardly and rearwardly extending teeth 46, which may be curved and are shown in detail in Figs. 6 and 7.

The rotation of crank shafts 28 and 40 oscillating the jigger rods moves the teeth 46 downward back, up and forward at each revolution of the shaft 28 which causes the teeth to pierce the sod, tear out, lift and throw back the weeds and grass and to disintegrate the soil and loosen it from the roots and allow it to fall through the spaces between the fingers while the weeds and grass pass rearwardly and are shunted to one side as they pass over the laterally bent ends of the fingers.

Slightly in advance of the share 11 and at each side thereof are cutting coulters 47 that are adapted to sever from the sod the edges of the strip to be elevated by the lifting board. These coulters 47 are of the usual swiveled type and are adjustable to the desired depth of cut by screws 48.

A spring seat 49 is connected to the main frame 6 in position where the lever 17 and hand wheel 37 are easily accessible to the operator.

In operation the draw bar of the machine is attached to a tractor or team by which means it is operated. The depth of cut is determined by the operator and when the machine is put into motion, lever 19 is moved to a position where the cutting edge of the share is depressed to the desired depth; which lowering of parts also depresses coulters 47 to cut edges in advance of the plow. The forward movement of the machine forces the strip of soil severed by coulters and share up over the lifting board 10 where it is caught and disintegrated by the reciprocating teeth 46, the loosened dirt and pebbles if any, falling fully through the downwardly widening interfinger spaces, back into the trench while the weeds and grass with their roots bare are forced rearwardly along the upper surface of fingers 23; and by reason of the curvature and upward inclination of the fingers, and the momentum imparted to the mass by the jigger teeth, the weeds and grass are discharged in a windrow to the right of the machine.

Preferably velocity is imparted to teeth 46 considerable in excess of the forward movement of the machine. This is indicated by difference in the diameters of driving and driven sprocket wheels 31, and 29 respectively; the ration shown being about two to one; in other words crank shafts 28, 40 make, respectively two revolutions to one of wheels 3, 4. The accelerated motion of teeth 46 causes them to tear in and out of the sod and assists in the disintegration and separation of soil and vegetable growth.

It is desirable in devices of this character, that provision be made whereby a large obstruction such as a rock or a large hard lump of ground is not likely to subject the disintegrating means to breakage. The pivotal mounting of my disintegrating means makes the likelihood of breakage under such circumstances, practically negligible, because, in case the front end of the disintegrating means strikes such an obstacle, it will automatically rise over such obstacle instead of being forced downward and subject the apparatus to breakage. Due to its pivotal connection the disintegrating means allow the obstacle to pass rearwardly until the resiliency of the fingers 23 permits the obstacle to fall therebetween or enables the operator to stay the operation of the machine and remove the obstacle, the disintegrating means immediately returning to adjusted position upon the removal of the obstacle. It is thus seen that such a foreign substance will not subject my device to breakage upon the disintegrating means contacting therewith.

I claim—

1. In a weed and grass exterminating machine, a share and lifting board for elevating a strip of soil containing vegetable growth, reciprocating teeth adapted to contact with and disintegrate the strip while elevated, fingers attached to and in rear of said lifting board, said fingers being slightly aslant in an upward direction and adapted to support the strip and to allow disintegrated soil to fall therefrom back to the ground, said fingers being curved whereby the vegetable growth removed from the strip of soil is discharged to one side of the machine, and said reciprocating teeth being mounted on rods, which rods are adapted to be raised at their forward ends to allow hard substances to pass thereunder.

2. In a weed and grass exterminating machine, a share and lifting board for cutting and elevating a strip of soil, fingers adapted to support the strip of soil and to allow disintegrated soil to fall back to the ground; said fingers also adapted to support the vegetable growth removed from the disintegrated strip of soil, reciprocating teeth adapted to contact with and disintegrate the elevated strip of soil; means whereby the vegetable growth is discharged from said fingers to one side of the machine, and said reciprocating teeth being mounted on rods which are adapted to be raised at their forward ends to allow hard substances to pass thereunder.

3. In a weed and grass exterminating machine, means for cutting and elevating a strip of soil; means for holding the strip elevated; reciprocating teeth adapted to contact with and disintegrate the strip of soil while elevated; means for operating said teeth; means for raising or lowering said cutting and elevating means; and means for raising or lowering said reciprocating teeth, said raising and lowering means having a resilient connection with said reciprocating teeth for the purpose set forth.

4. In a weed and grass exterminating machine, means for cutting and elevating a strip of soil; means for holding the strip elevated; reciprocating teeth adapted to contact with and disintegrate the strip of soil while elevated; and means for operating said teeth; means for raising and lowering said cutting and elevating means, and means for raising or lowering said reciprocating teeth, said raising and lowering means having a resilient connection with said reciprocating teeth for the purpose set forth.

5. In a weed and grass exterminating machine, means for cutting and elevating a strip of soil containing vegetable growth; a lever for raising and lowering said means; means to support said elevated strip, reciprocating teeth adapted to contact with and disintegrate the strip of soil while elevated; means to operate said teeth; means for raising and lowering said teeth; said raising and lowering means having a resilient connection with said teeth to allow hard substances to pass between said teeth and said supporting means and relative means to the cutting, elevating and supporting means for shunting the vegetable growth from above the disintegrated soil.

6. In a weed and grass exterminating machine, means for cutting and elevating a strip of soil containing vegetable growth, a lever for raising and lowering said means; reciprocating teeth adapted to contact with and disintegrate the elevated strip of soil; means to operate said teeth; means for raising or lowering said reciprocating teeth; said raising and lowering means having a resilient connection with said teeth to allow hard substances to pass between said teeth and said supporting means; and fingers spaced apart and attached to the rear of the soil elevating means; said fingers being adapted to separate the disintegrated soil from the vegetable growth, and having curved rearward ends for diverting the vegetable growth to one side of the machine.

7. In a weed and grass exterminating machine, a frame; a shaft on which said frame is mounted; wheels supporting said shaft; means adapted to cut and elevate a strip of soil; beams connected to said means, a pivotal connection between said beams and said frame, a sleeve on said shaft, arms on said sleeve, a pivotal connection between said arms and said beams, and a lever for actuating said sleeve to raise or lower said plow.

8. In a weed and grass exterminating machine, a frame; a shaft on which said frame is mounted; wheels supporting said shaft; means adapted to cut and elevate a strip of soil; beams connected to said means; a pivotal connection between said beams and said frame; a sleeve on said shaft; arms on said sleeves; a link pivotally connecting said arms with said beams; a lever for moving said sleeve to raise or lower said plow; and a sector plate on said frame for holding said lever.

9. In a weed and grass exterminating machine, a share and lifting board for severing and elevating a strip of soil containing vegetable growth, disintegrating mechanism adapted to act upon the elevated strip of soil while elevated to separate the vegetable growth from the strip of soil, a lever for raising or lowering said share to cut a thicker or thinner strip of soil, and means resiliently connected to said disintegrating mechanism for raising or lowering said disintegrating mechanism for the purpose specified.

10. In a weed and grass exterminating machine, a frame, a shaft on which said frame is mounted, wheels supporting said frame said wheels secured to said shaft, beams having upper forward ends pivotally connected to said main frame, a share and lifting board attached to lower rearward ends of said beams, a sleeve on said shaft, pivotal connections between said sleeve and said beams, and means for turning said sleeve on said shaft to raise or lower said share and lifting board.

11. In a weed and grass exterminating machine, a frame, a shaft on which said frame is mounted, wheels supporting said frame said wheels secured to said shaft, beams having upper forward ends pivotally connected to said frame, a share and lifting board attached to lower rearward ends of said beams, a sleeve on said shaft, arms on said sleeve, links pivotally connecting said arms with said beams, and a lever connected to said sleeve for the purpose specified.

12. In a weed and grass exterminating machine, a frame, a shaft on which said frame is mounted, wheels supporting said frame said wheels secured to said shaft, beams having upper forward ends pivotally connected to said frame, a share and lifting board secured to lower rearward ends of said beams, rearwardly extending arms attached to said beams said arms supporting side plates, disintegrating mechanism supported by said arms between the side plates, a driving connection between said shaft and said disintegrating mechanism, and means for raising and lowering said beams for the purpose specified.

13. In a weed and grass exterminating machine, a frame, a shaft on which said frame is mounted, wheels supporting said frame said wheels secured to said shaft, beams pivotally attached to said frame, a share and lifting board attached to said beams, rearward extending fingers attached to said lifting board, arms secured to said beams, disintegrating mechanism supported above said fingers by said arms, a driving connection between said disintegrating mechanism and said shaft and means for raising and lowering said beams for the purpose specified.

14. In a weed and grass exterminating device, a share and lifting board for elevating a strip of soil containing vegetable growth, means for supporting said strip of soil, reciprocating disintegrating means adapted to act upon the strip of soil while supported and to move the vegetable growth therealong, and said disintegrating means being resiliently supported at its forward end to allow hard substances to pass thereunder in the manner set forth.

15. In a weed and grass exterminating device, a frame; a main shaft on which said frame is mounted; wheels supporting said shaft; means adapted to cut and elevate a strip of soil; beams connected to said means and pivotally connected to said shaft; arms connected to said beams and being adapted to support side boards; a crank shaft extending through said side boards; disintegrating means pivotally connected at its rear end to said crank shaft, and the front end of said disintegrating means being mounted on another crank shaft; and said other crank shaft being resiliently mounted for the purpose specified.

16. In a weed and grass exterminating device, a frame, a main shaft on which said frame is mounted; wheels supporting said shaft; means adapted to cut and elevate a strip of soil; beams connected to said means and pivotally connected to said shaft; arms connected to said beams; side boards supported by said arms; a crank shaft extending through said side boards; disintegrating means pivotally connected at the rear end thereof to said crank shaft; the front end of said disintegrating means being mounted on another crank shaft; said other crank shaft resiliently mounted for the purpose specified; and a driving connection between said main shaft and said first mentioned crank shaft.

17. In a weed and grass exterminating device, a frame; a main shaft on which said frame is mounted; wheels supporting said main shaft; means adapted to cut and elevate a strip of soil; beams connected to said means and pivotally connected to said main shaft; arms connected to said beams; side boards supported by said arms; a crank shaft extending through said side boards; disintegrating means pivotally connected at its rear end to said crank shaft, and mounted at its front end on another crank shaft; said other crank shaft resiliently mounted for the purpose specified; and a driving connection between said main shaft and said first mentioned crank shaft and between said first mentioned crank shaft and the other crank shaft.

In testimony whereof, I have hereunto set my hand at Los Angeles, California, this 17th day of March, 1920.

JOHN P. HIRD.

Witness:
JAMES R. TOWNSEND.